July 5, 1949.  F. E. CONDON  2,474,827
SEPARATION OF HYDROCARBONS
Filed Oct. 7, 1946
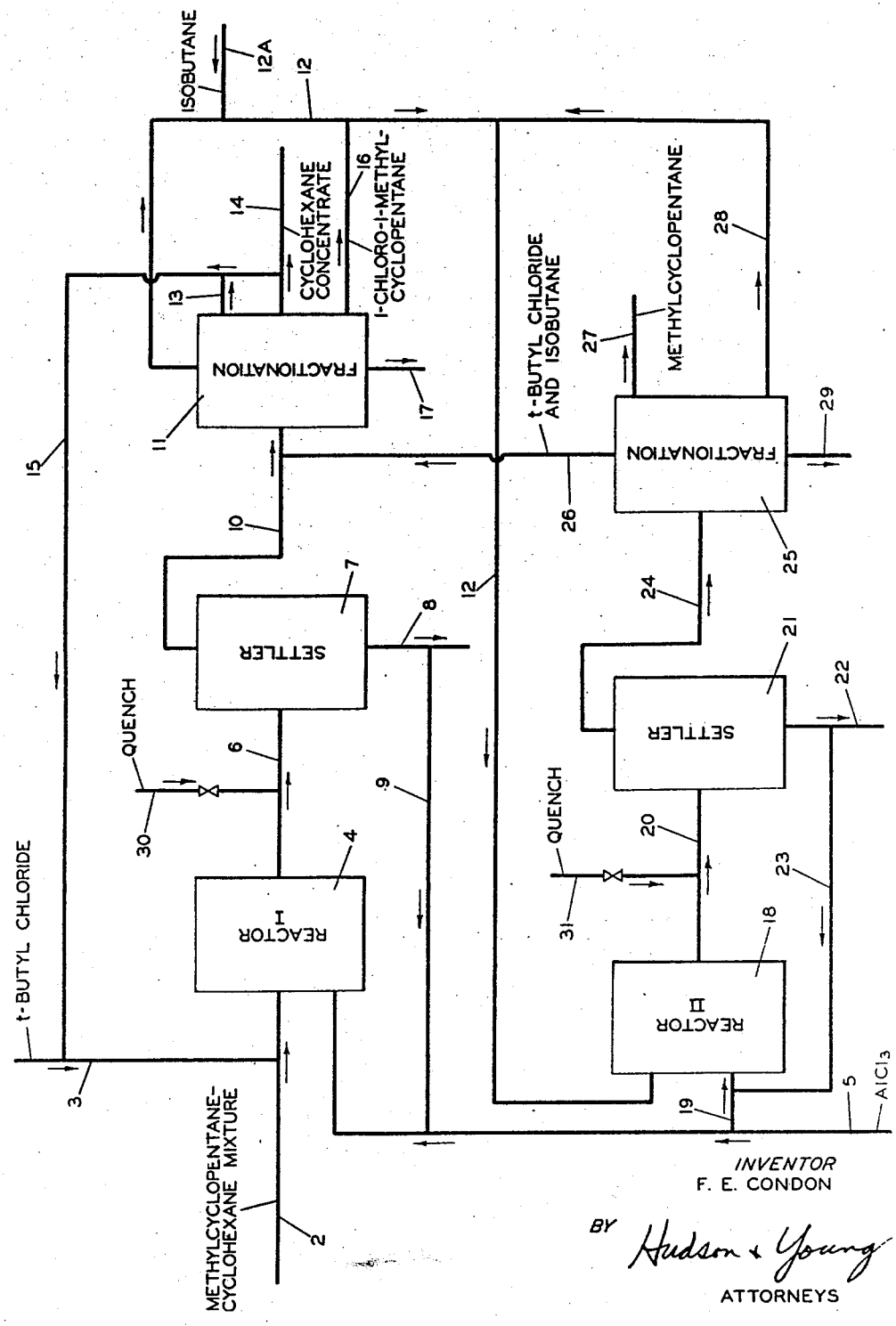
INVENTOR
F. E. CONDON
BY Hudson & Young
ATTORNEYS Patented July 5, 1949

2,474,827

UNITED STATES PATENT OFFICE 2,474,827

SEPARATION OF HYDROCARBONS

Francis E. Condon, Bartlesville, Okla., assignor to Phillips Petroleum Company, a corporation of Delaware Application October 7, 1946, Serial No. 701,848

16 Claims. (Cl. 260—666)

This invention relates to the separation of hydrocarbon types. In one specific embodiment, the invention relates to the treatment of a narrow boiling range saturated hydrocarbon fraction to segregate same into its components. The invention in certain aspects relates to the recovery of saturated hydrocarbons containing a tertiary carbon atom from admixture with like-boiling non-tertiary saturated hydrocarbons.

Mixtures of saturated hydrocarbons, by which term I mean paraffins and/or cycloparaffins (naphthenes), occur in nature, and also are produced by various hydrocarbon conversion and synthesis processes. While it is relatively easy to separate fractions in accordance with the number of carbon atoms per molecule by simple fractional distillation, it is much more difficult to separate individual hydrocarbons of a given number of carbon atoms per molecule from other hydrocarbons having the same number of carbon atoms per molecule. For example, a natural gasoline may be subjected to fractional distillation whereby separate fractions are recovered comprising essentially methane, ethane, propane, butanes, pentanes, hexanes, heptanes, octanes, nonanes, and decanes and heavier, respectively. However, it is difficult to separate isobutane from normal butane, yet more difficult to separate isopentane from normal pentane, and much more difficult to separate the various isomeric hexanes, heptanes, or octanes one from the other. Furthermore, there is a certain amount of overlap between the boiling points of the higher homologs of the paraffin series. Additionally, cycloparaffins may appear in the various fractions to a greater or lesser extent, depending upon the source of the material in question.

Mixtures of saturated hydrocarbons are derived from natural gasoline or straight run gasoline. They may also be derived from products of hydrocarbon cracking, dehydrogenation, or aromatizing reactions by treating such products to remove therefrom any unsaturated hydrocarbons, such as monoolefins, diolefins, or acetylenes, as well as aromatic hydrocarbons which may be present. Similar complex hydrocarbon mixtures resulting from synthesis reactions, such as those involving the reaction of hydrogen with carbon monoxide and/or carbon dioxide, may be treated to segregate saturated from unsaturated materials. Treatments to separate paraffins and cycloparaffins from admixture with unsaturated or aromatic hydrocarbons are well known in the art and may include physical methods such as solvent extraction, azeotropic distillation, extractive distillation, or fractional crystallization, or adsorption, or may comprise chemical methods such as polymerization or selective alkylation. Furthermore, such mixtures may be subjected to hydrogenation to convert the unsaturated hydrocarbons to saturated hydrocarbons. Mixtures of saturated hydrocarbons prepared or derived from any of these mixtures may be treated in accordance with the present invention.

It will be seen from the foregoing that numerous methods are available for separating unsaturated from saturated hydrocarbons, due largely to the great difference in chemical reactivity. The problem is much greater when it is desired to separate one paraffin or cycloparaffin from another paraffin or cycloparaffin of similar boiling point. Fractional distillation, of course, is ineffective, and ordinarily there is insufficient difference in properties to permit a separation by solvent extraction or azeotropic distillation.

Ordinarily the branched chain paraffins and cycloparaffins are more valuable, either for use as such or as starting materials for various reactions, than are the straight chain paraffins or simple cycloparaffins having no alkyl side chains. However, in some instances one of the latter compounds may be more valuable than a branched chain compound with which it is found admixed. The saturated hydrocarbons having at least one tertiary carbon atom are ordinarily the most valuable inasmuch as they are highly reactive and thus useful in many ways. Insofar as liquid hydrocarbons are concerned, the more highly branched the carbon chain the higher the octane number, and thus the highly branched liquid paraffins and cycloparaffins are most useful as fuels for internal combustion engines. It is sometimes desirable and useful to be able to treat a wide boiling range mixture of hydrocarbons to separate the tertiary from the non-tertiary hydrocarbons; such a mixture may, for example, contain hydrocarbons having 5, 6 and 7 carbon atoms per molecule. In other instances such a mixture is more efficiently handled if separated into two or more fractions of different boiling ranges before treatment to segregate the hydrocarbon types.

It is an object of this invention to separate hydrocarbon mixtures into fractions according to the type of hydrocarbon contained therein.

It is another object of the invention to treat a narrow boiling range mixture or a wide boiling range mixture of saturated hydrocarbons to separate those hydrocarbons containing a tertiary carbon atom from those containing no tertiary carbon atom.

Another object of the invention is to separate an alkyl cycloparaffin from admixture with other saturated hydrocarbons.

A still further object is to recover a branched chain paraffin from admixture with other saturated hydrocarbons.

A still further object of the invention is to resolve a mixture of isobutane and normal butane into its components.

A further object is to separate cyclohexane from methylcyclopentane.

An additional object of the invention is to recover methylcyclopentane from normal hexane.

Another object is to separate a mixture of methylcyclohexane and normal heptane into its components.

A further object is to accomplish separations of the type described in cyclic and continuous manner.

Further objects and advantages of the invention will be apparent, to one skilled in the art, from the accompanying disclosure and discussion.

My invention accomplishes separations of the foregoing type by a chemical method. In accordance with a preferred embodiment of the invention the following steps are utilized.

(1) The hydrocarbon mixture, for example one containing methylcyclopentane (B. P. 72° C.) and cyclohexane (B. P. 81° C.), is reacted with a tertiary alkyl halide, for example tertiary butyl chloride (B. P. 51° C.) whose boiling point and the boiling point of its parent hydrocarbon, i. e. isobutane, are significantly different from those of the hydrocarbons in the mixture which it is desired to separate. The reaction is accomplished under carefully controlled conditions described hereinafter, in the presence of a catalyst, preferably aluminum chloride, which is active in effecting a halogen-hydrogen exchange reaction, which is represented in the specific case being discussed by the following equation:

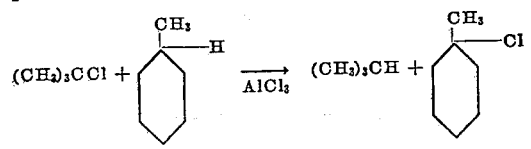

This reaction is highly specific for saturated hydrocarbons having a tertiary hydrogen atom, and saturated hydrocarbons without a tertiary hydrogen atom are not affected under the conditions of the reaction. A secondary alkyl halide may be substituted for the tertiary alkyl halide reactant if desired.

(2) The resulting reaction mixture is separated from the catalyst and subjected to fractional distillation to isolate the alkyl halide produced from the hydrocarbon in the mixture which contained a tertiary hydrogen atom. In the specific example given, the methylcyclopentane has been converted to 1-chloro-1-methylcyclopentane, whose boiling point is about 122° C. This separation is easily accomplished because this boiling point is widely different from the boiling point of any other component of the reaction mixture.

(3) The new alkyl halide is next reacted with an added saturated hydrocarbon which has a tertiary carbon atom, in a second halogen-hydrogen exchange reaction. This added hydrocarbon is preferably that produced in the first step from the first tertiary alkyl chloride employed in that step, and in this particular instance is isobutane.

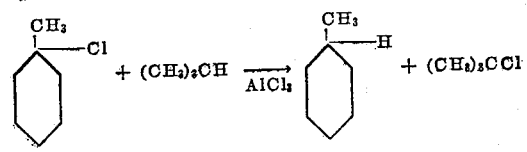

The reaction is accomplished in the presence of aluminum chloride or other suitable catalyst, and serves to regenerate the original alkyl halide, e. g. tertiary butyl chloride, which is later recycled to the first step for re-use. By means of this second halogen-hydrogen exchange reaction, the tertiary halide produced in the first reaction is reconverted to the original tertiary hydrocarbon which it is desired to recover, i. e. methylcyclopentane.

(4) The resulting regenerated tertiary hydrocarbon is recovered in a final step from the reaction mixture resulting from the second halogen-hydrogen exchange, by simple fractional distillation, which is easily accomplished because of the great difference in boiling points.

By means of this integrated series of steps, effected with carefully controlled reaction conditions in each step, methylcyclopentane or other saturated hydrocarbon containing a tertiary carbon atom is separated in pure state from its admixture with another close-boiling saturated hydrocarbon which has no tertiary carbon atom. Correspondingly, the concentration of the latter hydrocarbon in the original mixture is greatly increased.

The preferred temperature range for the first halogen-hydrogen exchange reaction, i. e. step 1, is 0 to 40° C., although much lower temperatures may also be used. The pressure may be atmospheric or even subatmospheric, but in the event that isobutane or other highly volatile reactant or product is employed, elevated pressures sufficient to maintain the reaction mixture in liquid phase are preferred. The reaction time should be short and is usually within the range of 0.05 to 10 minutes; a reaction time of one minute is ordinarily preferred, inasmuch as long reaction times favor undesired side reactions with consequent reduction in ultimate yield. Although the proportion of the alkyl halide added is not critical, it is preferred that the molecular ratio of added alkyl halide to hydrocarbon containing a tertiary carbon atom be at least about 1:1. Aluminum bromide as well as aluminum chloride are highly satisfactory catalysts. Other active metal halides of the Friedel-Crafts type may likewise be used. The catalyst may be employed in any conventional form, but preferably a hydrocarbon-aluminum halide complex is employed which takes the form of a heavy liquid containing from 40 to 60 or 70 weight per cent aluminum halide. Although the halogen of the catalyst need not necessarily correspond to the halogen of the added tertiary or secondary alkyl halide, it is preferred that they so correspond in order to facilitate recovery or reuse of materials without having to contend with exchange of halogen between catalyst and reactants.

Reaction conditions for step 3 may be similar to those described above for step 1, although it is preferred that the mol ratio of added tertiary hydrocarbon to the tertiary halide which is to be reconverted into the oridinal hydrocarbon be at least about 1:1, and preferably somewhat in excess thereof.

The reaction of step 1 may be broadly represented by the following type formula:

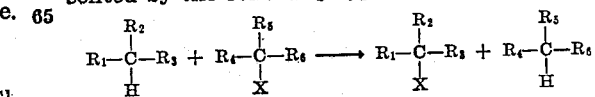

wherein $R_1$, $R_2$ and $R_3$ are each an alkyl or cycloalkyl group or $R_1$ and $R_2$ may be joined together forming with C a clcloparaffinic (cycloalkyl) radical; and wherein $R_4$ and $R_5$ are each an alkyl or cycloalkyl group and $R_6$ is an alkyl or cycloalkyl group or hydrogen, or $R_4$ and $R_5$ may be joined together forming with C a cycloparaffinic (cycloalkyl) radical; and X represents a halogen atom.

The converse reaction of step 3 is broadly represented by the equation:

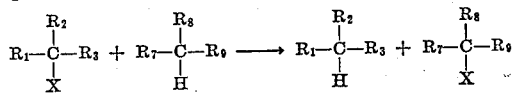

wherein $R_1$, $R_2$ and $R_3$ are as above, and wherein $R_7$, $R_8$ and $R_9$ is each an alkyl or cycloalkyl group or $R_7$ and $R_8$ may be joined together forming with C a cycloparaffinic radical; X represents a halogen atom.

Of course any of the above groups may be substituted with atoms or groups which do not prevent the principal reaction from taking place. It will be seen that the secondary or tertiary halides employed as step 1 reactants may be either alkyl or cycloalkyl compounds, if desired.

The accompanying drawing shows schematically one arrangement of apparatus elements and flow of materials therethrough suitable for the practice of my invention in a preferred embodiment. The drawing will be discussed in detail with specific reference to the treatment of a mixture of methylcyclopentane and cyclohexane. The corresponding treatment of other mixtures of tertiary and non-tertiary hydrocarbons will be apparent to one skilled in the art. It will likewise be understood that the drawing is diagrammatic only, and that many suitable conventional forms of equipment may be employed as desired for any particular situation. Auxiliary elements of apparatus, such as pumps, valves, heat exchangers, agitators, coolers, condensers, separators, automatic control means, and the like, are not shown in the drawing for the sake of simplicity, inasmuch as the supplying of such elements is well within the skill of the art.

In the drawing, a mixture of methylcyclopentane and cyclohexane from which the separation of methylcyclopentane is desired is passed into reactor 4 through inlet conduit 2. Tertiary butyl chloride enters reactor 4 through inlet conduit 3. A fluid aluminum chloride-hydrocarbon complex enters reactor 4 through inlet 5. Reactor 4 may comprise any suitable equipment for effecting a rapid and intimate intermixture of reactants with catalyst, for example a mixing pump or agitated pressure vessel. After a short reaction time the contents of reactor 4 are withdrawn through conduit 6 into settler 7 in which a heavier catalyst phase separates from a lighter hydrocarbon phase. If necessary or desired, water or other materials for quenching the reaction may be introduced through conduit 30. The heavier phase may be withdrawn from settler 7 through outlet 8 and may be revivified by means not shown, for example by addition of fresh solid aluminum chloride. Preferably at least part of the catalyst phase is recycled from settler 7 via lines 8, 9 and 5 to reactor 4. The lighter phase is passed from settler 7 through conduit 10 to fractionation system 11 which ordinarily comprises a series of two or more fractional distillation columns and associated equipment. Prior to fractionation this phase may be treated by conventional means to remove dissolved and/or suspended catalyst.

From fractionator 11, the following fractions are withdrawn (1) a low-boiling fraction, comprising chiefly isobutane, which is passed through conduit 12 to reactor 18; (2) a fraction, comprising unreacted t-butyl chloride, which is recycled, as through conduits 13, 15, 3, and 2, to reactor 4; (3) a fraction, comprising a cyclohexane concentrate containing some methylcyclopentane, which may be withdrawn as a product of the process through outlet 14, but part of which is preferably recycled, as through conduits 15, 3 and 2, to reactor 4 for further concentration; (4) a fraction, comprising 1-chloro-1-methylcyclopentane, which is passed through conduits 16 and 12 to reactor 18; and (5) a minor fraction, comprising heavy hydrocarbons formed by side reactions such as alkylation and/or polymerization, which is withdrawn through outlet 17. The mixture of isobutane and 1-chloro-1-methylcyclopentane flowing through conduit 12 is passed to reactor 18, in which it is intimately contacted with fluid aluminum chloride-hydrocarbon complex catalyst, which enters through inlet 5 and conduit 19. Additional isobutane may be supplied, as required, through inlet 12A. The effluent from reactor 18 is passed through conduit 20 to settler 21, in which a heavier or catalyst phase separates from a lighter or hydrocarbon-rich phase. The heavier phase may be withdrawn through outlet 22 for revivification, but is preferably recycled, at least in part, through conduits 23 and 19 to reactor 18. The lighter phase may be treated for removal of dissolved and/or suspended catalyst in means not shown. This phase is passed through conduit 24 to fractionator 25, which, in practice, is usually a series of fractionating columns. From fractionator 25, the following fractions are withdrawn: (1) a low-boiling fraction, comprising isobutane and t-butyl chloride, which is passed through conduits 26 and 10 to fractionator 11; (2) a fraction, comprising substantially pure methylcyclopentane, which is withdrawn through outlet 27 as a product of the process; (3) a fraction, comprising unreacted 1-chloro-1-methylcyclopentane, which is recycled, as through conduits 28 and 12, to reactor 18; and (4) a kettle product, comprising relatively high-boiling hydrocarbons, which is withdrawn from the system through outlet 29. Quench 31 is provided if desired.

Although the invention has been described with particular reference to the recovery of methylcyclopentane from admixture with cyclohexane, it may likewise be applied to other mixtures of tertiary and non-tertiary saturated hydrocarbons. A partial list of such mixtures to which the invention is particularly applicable is given in Table I.

EXAMPLES OF MIXTURES SEPARABLE BY INVENTION

TABLE I

| Reactive Component | (B. P., °C.) | Inert Component | (B. P., °C.) |
|---|---|---|---|
| Isobutane | −12 | Cyclobutane | −13 |
| Isobutane | −12 | n-Butane | −1 |
| Isopentane | 28 | n-Pentane | 36 |
| 2,3-dimethylbutane | 58 | 2,2-dimethylbutane | 50 |
| 2,3-dimethylbutane | 58 | Cyclopentane | 49 |
| 2-methylpentane | 60 | n-Hexane | 69 |
| 3-methylpentane | 63 | n-Hexane | 69 |
| Methylcyclopentane | 72 | n-Hexane | 69 |
| Methylcyclopentane | 72 | Cyclohexane | 81 |
| 2,4-dimethylpentane | 81 | 2,2-dimethylpentane | 79 |
| 2,4-dimethylpentane | 81 | Cyclohexane | 81 |
| Methylcyclohexane | 101 | n-Heptane | 98 |

It is thus apparent that the invention is preferably applied to the separation of tertiary saturated hydrocarbons containing not in excess of 7 carbon atoms per molecule, although others are of course not outside the broader scope of the invention. Since the tertiary alkyl halides formed from these hydrocarbons are reacted with tertiary saturated hydrocarbons in the second reaction of the process, it is likewise apparent that alkyl halides containing not in excess of 7 carbon atoms per molecule may also be employed in the first reaction steps of the process. Various examples of same are given in the following paragraph. The same preference as to tertiary saturated hydrocarbons applies to those used as reactants in the second step, since as stated hereinbefore such a hydrocarbon is preferably that produced in the first step from the tertiary alkyl halide employed in that step.

Although tertiary butyl chloride has been cited as a specific example of reactant, various other tertiary and secondary halides, preferably the chlorides and bromides, may be employed, so long as the boiling point relationships described hereinabove are such as to allow recovery of the desired intermediate tertiary halide by simple fractional distillation. As examples of suitable halide reactants may be mentioned isopropyl chloride; the various secondary and tertiary halo-pentanes such as 2-bromo-2-methyl butane, 2-bromo-3-methyl butane, 2-bromopentane, 3-chloropentane; sec-butyl chloride; diisopropyl chloride (2-chloro-2,3-dimethyl butane); 1-chloro-1-methyl cyclopentane; cyclohexyl chloride.

The following example is given to illustrate specific conditions suitable for practicing the reaction steps of the invention. It will be appreciated, of course, that the stated conditions are by no means exhaustive of the broadest scope of the invention.

A mixture of 114.7 grams of t-butyl chloride (1.24 moles), 114.3 grams of methylcyclopentane (1.36 moles) and 38.5 grams of cyclohexane, cooled in ice, was stirred vigorously with 4.0 grams of AlCl₃ for 120 seconds. Then 25 cc. of water was added to wash out the AlCl₃. When the dried hydrocarbon mixture was fractionated, there were obtained 18.1 grams (0.31 mole) of isobutane, 76.2 grams (0.83 mole) of unreacted t-butyl chloride, 84.9 grams (1.01 moles) of unreacted methylcyclopentane, 32.2 grams of cyclohexane, 36.0 grams (0.30 mole) of 1-chloro-1-methylcyclopentane and 4.1 grams of high-boiling residue.

A mixture of 150.2 grams (1.27 moles) of 1-chloro-1-methylcyclopentane prepared in several runs from a mixture of methylcyclopentane and cyclohexane as described above, and 107 grams (1.84 moles) of isobutane, was stirred with about 6 grams of AlCl₃ at 0° C. for about 7 minutes. Water was added, the material then dried, and the dried reaction mixture was fractionated. There were obtained about 70 grams of isobutane (1.2 moles), 36.5 grams of t-butyl chloride (0.40 mole), 41 grams of the regenerated methylcyclopentane (0.49 mole), 80 grams (0.68 mole) of unreacted 1-chloro-1-methylcyclopentane, and some high-boiling residue.

I claim:

1. A hydrocarbon separation process which comprises reacting a mixture comprising at least one saturated hydrocarbon having a tertiary carbon atom and at least one saturated hydrocarbon free from a tertiary carbon atom with a halide selected from the group consisting of secondary and tertiary alkyl and cycloalkyl halides in the presence of a Friedel-Crafts type metal halide catalyst under conditions effecting halogen-hydrogen exchange as the principal reaction, said conditions comprising temperatures not exceeding 40° C. and reaction time not exceeding 10 minutes, separating from the reaction mixture the tertiary halide resulting from substitution of halogen for hydrogen on the tertiary carbon atom of the above-mentioned saturated hydrocarbon, reacting the so-separated tertiary halide with a saturated hydrocarbon having a tertiary carbon atom in the presence of a Friedel-Crafts type metal halide catalyst under conditions effecting halogen-hydrogen exchange as the principal reaction, said conditions comprising temperatures not exceeding 40° C. and reaction time not exceeding 10 minutes, and recovering from the reaction mixture the first-mentioned tertiary saturated hydrocarbon which has been thus generated from the said tertiary halide by substitution thereon of hydrogen for halogen.

2. A process for separating and recovering a saturated hydrocarbon (A) having a tertiary carbon atom from admixture with a saturated hydrocarbon (B) free from a tertiary carbon atom, which comprises contacting a mixture of (A) and (B) with a halide (C) selected from the group consisting of secondary and tertiary alkyl and cycloalkyl halides, in the presence of a Friedel-Crafts type metal halide catalyst at such a low temperature and for such a limited reaction time as to effect as the principal reaction a halogen-hydrogen exchange whereby (A) is converted to a tertiary halide (D) by substitution of a halogen atom for the hydrogen atom on the tertiary carbon atom and (C) is converted to a saturated hydrocarbon (E) by substitution of a hydrogen atom for the halogen atom and whereby (B) remains substantially unchanged, separating the resulting hydrocarbon-organic halide reaction mixture from the catalyst, subjecting said mixture to a first fractional distillation to recover (D) as an intermediate product and a concentrate of (B) as a product of the process, then contacting the thus-separated (D) with a saturated hydrocarbon (F) having a tertiary carbon atom in the presence of a Friedel-Crafts type metal halide catalyst at such low temperatures and for such a limited reaction time as to effect as the principal reaction a halogen-hydrogen exchange whereby (D) is reconverted to (A) by substitution of a hydrogen atom for the halogen atom on the tertiary carbon atom and whereby (F) is converted to a tertiary halide (G) by substitution of a halogen atom for the hydrogen atom on the tertiary carbon atom, separating the resulting hydrocarbon-organic halide reaction mixture from the catalyst, and recovering (A) by fractional distillation from the thus separated mixture as a product of the process.

3. The process of claim 2 in which each said Friedel-Crafts type catalyst is an aluminum halide.

4. The process of claim 2 in which each said Friedel-Crafts type catalyst is a liquid aluminum chloride-organic complex.

5. The process of claim 2 in which a portion of said concentrate of (B) is recycled to the first reaction to increase the ultimate recovery of (A).

6. The process of claim 2 in which the boiling points of (A) and (B) are sufficiently similar that separation of (A) from (B) by fractional distillation is difficult, and in which (C) and (F) are so chosen that (C) and (E) have boiling points substantially different from (A), (B) and (D) and that (F) and (G) have boiling points substantially different from (D) and (A).

7. The process of claim 2 in which a molar excess of (C) over (A) is maintained in the first halogen-hydrogen exchange reaction and in which a molar excess of (F) over (D) is maintained in said second halogen-hydrogen exchange reaction.

8. The process of claim 2 in which each said reaction time does not substantially exceed one minute.

9. The process of claim 2 in which (C) is tertiary butyl chloride.

10. The process of claim 2 in which (A) is methylcyclopentane and (B) is cyclohexane.

11. The process of claim 2 in which (A) is methylcyclopentane and (B) is normal hexane.

12. The process of claim 2 in which (A) is methylcyclohexane and (B) is normal heptane.

13. The process of claim 2 in which (C) is a tertiary halide, in which (E) and (F) are the same compound and (G) and (C) are the same compound, in which (E) is recovered from said first-named fractional distillation and passed to said second halogen-hydrogen exchange reaction as the reactant (F), and in which (G) is recovered from said second fractional distillation and passed to said first-named halogen-hydrogen exchange reaction as compound (C).

14. The process of claim 1 in which said first-mentioned and said second-mentioned saturated hydrocarbon having a tertiary carbon atom and said secondary and tertiary alkyl and cycloalkyl halides each contains not in excess of 7 carbon atoms per molecule.

15. The process of claim 2 in which (A), (F), and (C) each contains not in excess of 7 carbon atoms per molecule.

16. The process of claim 13 in which (A), (F), and (C) each contains not in excess of 7 carbon atoms per molecule.

FRANCIS E. CONDON.

REFERENCES CITED

The following references are of record in the file of this patent:

UNITED STATES PATENTS

| Number | Name | Date |
|---|---|---|
| 2,413,384 | Schmerling | Dec. 31, 1946 |